United States Patent Office 3,287,633
Patented Nov. 22, 1966

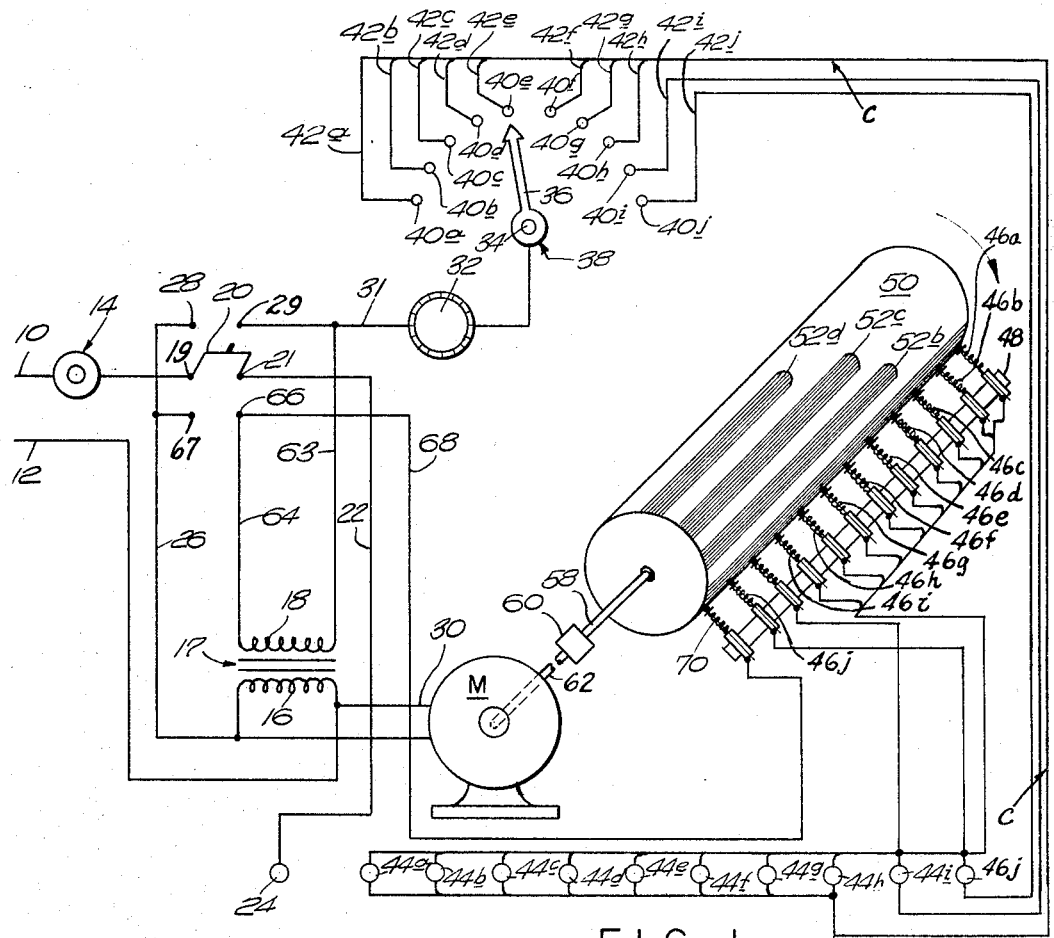

3,287,633
APPARATUS INCLUDING ROTARY DRUM MEANS FOR TESTING A PLURALITY OF ELECTRICAL CIRCUITS
George Joseph Mollo, 80 Brae St., North Providence, R.I.
Filed Apr. 28, 1964, Ser. No. 363,122
5 Claims. (Cl. 324—51)

The present invention relates to cable inspection and identifying apparatus and relates, more particularly, to apparatus for testing the individual wires of a multi-wire unit, such as a cable, for short circuits and grounds and for identifying the individual wires bundled into the cable.

To assure the proper connection and operation of electrical systems it is essential that each wire of the system be free of insulation breakdown, open circuits, short circuits and grounds. Further, it is imperative that each wire be connected at its opposite ends to corresponding and complementary terminals. Any defects in the wires as grounds or short circuits, and any departures from the proper connections of the wires in the electrical system will obviously lead to faulty and improper operation of the system. It is apparent, therefore, that the servicing of such systems is facilitated by the use of an apparatus which permits the ready detection of short circuits and grounds in an electrical system and affords ready identification of the wires of said system so that they can be properly connected to thereby provide electrical continuity in a circuit. Such advantageous features are incorporated in the instant invention.

It is, therefore, one object of the present invention to provide an improved cable inspection device capable of sequentially testing a plurality of wires for short circuits and grounds.

Another object of the present invention is to provide an improved apparatus which permits rapid and accurate identification of the individual wires of a multi-wire unit to establish electrical continuity for each of said wires.

Still, a further object of the present invention is to provide an improved cable inspection device employing a rotary switch having a plurality of electrical contacts thereon which are cooperable with a plurality of electrical contacts to provide a signal for testing for short circuits and grounds in a multi-wire unit, and for identifying the various wires of the unit.

Yet, an additional object of the present invention is to provide an improved cable inspection and identifying device for sequentially testing each wire of a multi-wire unit for short circuits and grounds wherein each wire is connected to a separate terminal and a selector switch is actuated to sequentially energize the wires in order that each said wire may give off a signal to indicate the presence or absence of a short circuit in the individual wires, and whereby when the wires are connected to said separate terminals, the wires may be energized through a motorized rotary switch to send out a signal which may be recorded at the opposite end of each wire to thereby identify it.

These and other objects of the present invention will be apparent from the detailed description of the invention when read in conjunction with the accompanying drawing wherein:

FIG. 1 is a circuit diagram of the inspection and identifying apparatus of the present invention;

FIG. 2 is a development of the motorized rotary switch employed in conjunction with the circuitry of FIG. 1; and FIG. 3 is a viewing illustrating a cable under test with the apparatus of the present invention.

Referring now to the drawing the reference numerals 10 and 12 designate A.C. power lines leading from a suitable electrical source such as 110 volts. A fuse 14 is provided in line 10. Power line 12 is connected through the primary winding 16 of a transformer 17 to motor M. Power line 10 is connected to a pole 19 of double pole-double throw switch 20. The opposite pole 21 of switch 20 is connected through lead 22 to a ground receptacle 24.

One side of double pole switch 20 has a lead 26 connected at the pole 28 thereof and joined to the primary transformer winding 16. A line 30 is connected to lead 28, providing a conductor between said line 30 and the motor M. The companion pole 29 of switch 20 has a lead 31 connected through a test lamp 32 to a shaft 34, which carries a pointer arm 36 of a test circuit selector switch 38. Said selector switch 38 has a bank of stationary contacts 40a–j associated therewith. These contacts 40a–j are preferably provided with spaced numerical indicia to indicate the particular wire connected for testing at any particular moment.

Each of the contacts 40 is provided with a lead 42a–j, the opposite ends of each said lead forming a cable C being connected through an independent binding post 44a–j, to a companion contact 46a–j, the binding posts being electrically isolated from each other. Representative connections from 42j to 44j and then 46j and also 42i to 44i and then 46i are shown in FIG. 1. However, for simplicity's sake the remaining connections between 42a–h and 44a–h and 46a–h have been combined into a single line cable to prevent the confusion of the many lines that otherwise might be used. Desirably, each of said binding posts 44 is provided with numerical indicia and, most suitably, these indicia correspond with the marking on its complimentary contact 40. As just stated, each of the leads 42a–j extends from each of a binding post 44a–j to a respective electrically conductive contact 46a–j carried in alignment on a common arm 48.

A drum or cylinder 50 of dielectric material which may be appropriated called a "rotary switch" is positioned to extend along the length of the array of contacts 46. As best seen in the projection of the rotary switch 50 in FIG. 2, a plurality of spaced metallic strips or, commutator bars, 52a–j are arranged around the periphery thereof. Each commutator bar is extended from one end of the rotary switch 50 longitudinally in the direction toward the opposite end of said switch. However, it will be noted that the commutator bars are progressively longer with each succeeding one. Moreover, it will be observed that, while the spacing between the commutator bars is generally uniform, there is a relative wide space at 54 between the longest of the strips and the shortest one thereof, see FIG. 2. The purpose of this wider spacing will become apparent hereafter.

It will be observed that the linear spacing between each of the contacts 46 is such that contact 46a engages only commutator bar 52a when rotary switch 50 is rotated. Contact 46b contacts commutator bars 52a and 52b. In like fashion each succeeding contacts 46c–j is engaged by a further one of the commutator bar. Hence, in consequence of one full revolution of rotary switch 50, contact 46a would receive one impulse or signal by virtue of its engagement solely by commutator bar 52a. By the same token contact 46b would receive two impulses or signals by being contacted by commutator bars 52a and 52b. It follows that each one of the succeeding contacts 46c–j will receive one more impulse or signal than the next prior contact, the contact 46j obviously receiving ten impulses. As will become evident hereinafter, the precise number of impulses induced by rotation of rotary switch 50 is advantageous both in testing a cable for short circuits and ground, and for wire identification.

As seen in FIG. 1 rotary switch 50 is provided with an axial shaft 58 projecting from one end thereof. This shaft 58, in turn, is connected through an insulating coupling 60 to shaft 62 of motor M. Thus, as motor M is powered, rotary switch 50 is rotated to carry the commutator bar 52a–j into engagement with contacts 46 in the manner just described. Motor M may, advantageously be a gear motor of the type capable of rotating switch 50 in the order of four (4) r.p.m.

One side of the secondary winding 18 of transformer 17 is connected by a lead 63 to lead 31. A further lead 64 is taken off the opposite side of secondary winding 18 and is connected to terminal 67 at the opposite side of switch 20 from terminal 28. A line 68 is connected to terminal 66 and is connected at its opposite end to a further contact 70. Said contact 70 is carried on arm 46 and is positioned to communicate with each commutator bar 52 as rotary switch 50 is rotated. Thus, in the absence of short circuits or grounds in a wire under test, line 68 serves to complete the test circuit.

To ready or prepare the instant apparatus for testing the individual conductor wires of a cable C for short circuits, or to inspect the plurality of wires leading from a common panel for like short circuits or grounds, the individual conductor wires are connected individually to one of the binding posts 44a–44j as shown in FIG. 3. For purposes of the present discussion it may be assumed that a conductor wire is connected to each binding post 44a–j.

To initiate the test for short circuits or grounds a ground wire GW is connected between ground receptacle 24 and the conductive sheath of the cable C in which the individual wires are bundled and to which one may be ground (see FIG. 3). On the other hand, if the wires being tested are enclosed within a conductive panel or the like the ground wire would be connected between said panel or other unit and ground receptacle 24. Thus, in the event of an insulation breakdown or of a grounded or short circuited wire, current will flow from the wire under test to ground.

Under these conditions double pole-double throw switch is closed against poles 66, 67 thereby energizing the circuitry to introduce line voltage to motor M for rotating rotary switch 50. At the same time line voltage flows through lead 26 to transformer 17 where this voltage is stepped down to the order of 6 volts on the secondary side. Thus, this induced, stepped-down current flows through leads 63 and 31, selector switch 38, leads 42a–j, through cable C, across binding posts 44a–j, to contacts 46a–j through commutator bars 52a–j, across contact 70 and through lead 68 to complete the circuit. This circuitry constitutes the "test circuit" of the instant invention. With the test circuit energized selector switch arm 36 is, for convenience, firstly engaged with contact 40a. This energizes lead 42a, which, it will be recalled, is associated with contact 40a and is connected across binding post 44a. Rotation of rotary switch 50 causes commutator bar 52a to engage contact 46a. Upon engagement of commutator bar 52a with contact 46a current flows through contact 70 and lead 68 whereupon the test circuit is completed. Thus, the test circuit is energized to yield a momentary current flow, as commutator bar 52a rotates past contact 46a, thereby causing test lamp 32 to flash intermittently, once for every full revolution of rotary switch 50. Selector switch arm 36 is thereupon stepped to contact 40b which provides a test for the wire connected to binding post 44b. This procedure is continued until contact 40j is reached or until all the wires attached to the several binding posts 44 have been tested. Obviously, it is desirable to cause arm 36 to pause on each contact briefly to insure that rotary switch 50 will have had time to carry the appropriate commutator bar or bars 52a–j into contact with the appropriate contacts 46a–j. In the event any conductor wire on any of the binding posts 46 is grounded or short circuited current to its enclosure sheath of cable C, or a panel or the like, current will leak across the wire being tested to ground through the test ground wire GW connected from the cable C, or other enclosure, to terminal 24. This causes continuous energization of the test circuit, in consequence of which test lamp 32 remains on constantly. The position of pointer arm 36 of the test circuit indicates the conductor wire attached to the related binding post 44a–j which is defective.

In accordance with the advantageous features of the instant invention, conductor wires bundled in a harness or cable can be checked for electrical continuity and, thereby be readily identified, thereby insuring that the opposite ends of each wire are known for proper connection to corresponding and complimentary terminals. To this end the wires constituting the cable, conduit, etc., or attached individually to the binding posts 44a–j. A test line is connected to the conductive sheath of the cable C or conduit and is also connected into receptable 24 (see FIG. 3). It will serve herein, again, to assume, for purposes of the present discussion that there are ten wires to be identified and that they are attached separately to the binding posts 44a–j. Obviously, if the wires that have just been described as being tested for short circuits and grounds are to be also identified, the present invention affords a ready and efficient means for shifting from one test circuit to the other. Thus, to energize the "identification circuit," double pole-double throw switch 20 is closed against terminals 28, 29. In consequence thereof, line current is applied to motor M whereby to drive the motor and rotate rotary switch 50. Again, transformer 17 acts to step down the line voltage providing current in the order of 6 volts through lead 64, lead 68, through contact 70, commutator bars 52, contacts 46, and leads 42 to the wires on binding posts 44.

Now, at the opposite ends of each of the wires an instrument having a test light or other indicator is connected to the remote wires of the cable, one by one. The opposite line of the instrument is grounded to the conductive sheath of the cable. The identification circuit is completed as current flows from the sheath through ground receptacle 24 and lead 22.

With switch 20 closed, as just described, the test instrument is applied to any arbitrary one of the wires of the conduit or cable. Rotary switch 50 is, as already stated, rotating to thereby cause commutator bars 52a–j to move past contacts 46a–j. Observation is made on the test instrument of the delay in flashing of the indicator or other actuation of the signal of the test device. Said delay is occasioned by the contacts 46a–j being in the zone of space 54. This, of course, provides a convenient moment at which to begin counting the flashes or signals transmitted. Thus, after said delay, if it is observed, let us say, that three flashes or signals are observed or read on the test instrument at the remote end of the wire it would be known that the opposite end of this wire was connected at binding post 44c. This arises by virtue of the fact that binding post 44c is connected to contact 46c and, as earlier pointed out, contact 46c is engaged by commutator bars 52a, 52b and 52c in the course of one revolution of rotary switch 50. This engagement, obviously, sends out three equally spaced signals. The further identification of each succeeding wire of the cable or conduit would, understandably, be carried out in the same manner as just related until each wire of the bundle was identified and marked.

The present testing and identifying apparatus has been illustrated and described in conjunction with a capability of the apparatus for sequentially testing ten conductor wires at one time. Manifestly, the number of wires which may be sequentially tested at any one time may be increased ad infinitum by increasing the number of binding posts 44 and by correspondingly increasing the number of selector switch contacts 40, leads 42, contacts 46, and commutator bars 52.

From the foregoing it will be seen that the present invention provides a relatively simple, yet highly efficient device for rapidly and accurately testing wires for short circuits and grounds and, combined therewith, means for quickly identifying the various wires of a bundled group of wires for proper connection thereof.

Since certain changes may be made in the above apparatus without departing from the scope of the invention herein involved, it is intended that all matter contained in the above description or shown in the accompanying drawing be interpreted as illustrative only and not in a limiting sense.

What is claimed is:

1. Apparatus for sequentially testing a plurality of electrical conductors for isolation from an electrically conductive enclosure comprising, a source of test current connected at one side to ground, a plurality of connecting posts, said connecting posts being electrically isolated from each other, each said connecting post being arranged to receive a one of said conductors to be tested, a circuit including a selector switch having a plurality of contact points, each said contact point being connected with an associated connecting post, a test indicator connected to said source and in series with said selector switch, a receptacle connectable with said conductive enclosure to thereby connect said enclosure to ground, a rotary drum, means for rotating said drum, said drum having a plurality of electrically conductive bars thereon connected to ground, a plurality of contact elements arranged in alignment to be engaged successively by said bars as said drum is rotated, said contact elements being each connected to an individual one of said connecting posts, means for directing current from the opposite side of said current source through said test indicator and said selector switch to said contact elements to test said conductors for isolation, said selector switch being operable to direct current to each of said conductors sequentially for testing, said bars being operable through periodic contact with said contact elements to periodically energize and deenergize said circuit to thereby intermittently actuate said indicator when a conductor under test is isolated from said enclosure, said indicator being actuated continuously by current leakage across said enclosure to ground when said conductor under test is in electrical contact with said enclosure.

2. Apparatus for successively testing a plurality of electrical conductors associated with an electrically conductive enclosure for electrical continuity comprising, a source of test current connected at one side to ground, a plurality of connecting posts, said connecting posts being electrically isolated from each other, each said connecting post being arranged to receive one of said conductors to be tested, a circuit including indicating means and a signalling means, said signalling means including a rotatable drum, means for rotating said drum, a plurality of electrically conductive bars of different lengths arranged around the periphery of said drum and connected to ground, a receptacle connected with said conductive enclosure to thereby connect said enclosure to ground, a plurality of contacts equal in number to the number of bars on said drum, each of said contacts being connected with one of said connecting posts, said contacts being so positioned that as said drum is rotated each succeeding contact is engaged by one more bar than the immediately preceeding contact, means for directing current from the opposite side of said current source through said indicating means to said contacts, said bars being operable through periodic engagement with said contacts to periodically energize and deenergize said circuit, said energization and deenergization being selectively obtainable by a switch to successively test each electrical conductor connected to a post, said energization and deenergization providing an identifying electrical signal at the end of said conductor remote from said connecting posts, said signal for a particular conductor being a series of indications equal in count to the number of times the given one of said contacts connected with said particular conductor under test across said the associated connecting post therefor is engaged by said bars in one full revolution of said drum.

3. Apparatus for sequentially testing a plurality of electrical conductors associated with an electrically conductive enclosure for isolation therefrom and for determining the electrical continuity of said conductors comprising, a source of test current connected at one side to ground, a plurality of connecting posts, said connecting posts being electrically isolated from each other, each said connecting post being arranged to receive a one of said conductors to be tested, a circuit including a selector switch having a plurality of contact points, each said contact point being connected with an associated connecting post, a test indicator connected in series with said selector switch, a receptacle connectable with said conductive enclosure to thereby connect said enclosure to ground, signalling means for supplying a separate identifying series of electrical impulses to each conductor from said source; control means for directing current from the opposite side of said current source selectively through said selector switch to said signalling means to test each of said conductors for isolation, and directly by another path, to said signalling means for testing said conductors for electrical continuity; said selector switch being operable when connected in said circuit to direct current to each of said conductors sequentially for testing, said signalling means being operable by a drive means to energize and deenergize a desired conductor in the circuit periodically to intermittently actuate said indicator when said conductor under test is isolated from said enclosure, said indicator alternatively being actuated continuously by current leakage through said enclosure to ground when said conductor under test is in electrical contact with said enclosure, said signalling means being further operable by said drive means to energize each conductor under test sequentially whereby to produce an identifying electrical signal at the end of each conductor remote from said each connecting posts when said conductor is isolated.

4. Apparatus for sequentially testing a plurality of electrical conductors associated with an electrically conductive enclosure for isolation therefrom and for determining electrical continuity of said conductors comprising, a source of test current connected at one side to ground, a plurality of connecting posts, said connecting posts being electrically isolated from each other, each said connecting post being arranged to receive a one of said conductors to be tested, a circuit including a selector switch having a plurality of contact points, each said contact point being connected with an associated connecting post, a test indicator connected in series with said selector switch, a receptacle connectable with said conductive enclosure to thereby connect said enclosure to ground, a signalling means including a rotatable drum, means for rotating said drum, a plurality of electrically conductive bars of different lengths arranged around the periphery of said drum and connected to ground, a plurality of contact elements equal in number to the number of bars on said drum, each of said contact elements being connected with one of said connecting posts, said contact elements being so arranged that as the drum is rotated each succeeding contact element is engaged by one more bar in number than the immediately preceeding contact element; control means for directing current from the opposite side of said test indicator and said current source selectively through said selector switch to said signalling means for testing said conductors for isolation, and for directing said current by another path to said signalling means for testing said conductors for electrical continuity; said selector switch being operable when connected in said circuit to direct current to each of said conductors sequentially for testing, said signalling means being operable by a drive means to energize and deenergize a selected conductor in the circuit periodically through periodic contact between said bars and said contact elements to thereby intermittently actuate said indicator when said selected conductor is isolated from said enclosure, said indicator alternatively being actuated continuously when said selected conductor is in electrical contact with said enclosure, said signalling means being operable by said drive means to energize each said conductor under test sequentially to provide an identifying electrical signal at the end of each said programmed conductor remote from the connecting posts which is equal in count to the number of times the given one of said contact elements connected with said programmed conductor under test across the associated connecting post therefor is engaged by said bars in one full revolution of said drum.

5. Apparatus as set forth in claim 4 wherein said drive means includes an electric motor for rotating said drum, means connecting said motor to a source of line current to operate said motor and drive said drum, a transformer connected to said line current and operable to provide a source of stepped-down current on the secondary side of said transformer, said stepped-down current providing the course of test current for the circuit.

References Cited by the Examiner
UNITED STATES PATENTS

| | | | |
|---|---|---|---|
| 1,977,703 | 10/1934 | Swartwout | 324—73 |
| 1,977,707 | 10/1934 | Weitzer | 324—73 X |
| 2,277,899 | 3/1942 | Aufiero | 200—24 |
| 2,682,616 | 6/1954 | Mork | 200—24 X |
| 2,699,528 | 1/1955 | Periale | 324—51 X |
| 2,869,076 | 1/1959 | Evans et al. | 324—73 X |
| 3,217,244 | 11/1965 | Glover | 324—51 |

RUDOLPH V. ROLINEC, *Primary Examiner.*

WALTER L. CARLSON, *Examiner.*

G. R. STRECKER, *Assistant Examiner.*